(12) United States Patent
Halcom

(10) Patent No.: US 9,863,468 B2
(45) Date of Patent: Jan. 9, 2018

(54) ROD END WEAR PREVENTION

(71) Applicant: Sikorsky Aircraft Corporation, Stratford, CT (US)

(72) Inventor: Lance Halcom, Coppell, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 607 days.

(21) Appl. No.: 14/029,312

(22) Filed: Sep. 17, 2013

(65) Prior Publication Data
US 2015/0078808 A1 Mar. 19, 2015

(51) Int. Cl.
*F16C 23/04* (2006.01)
*F16C 11/04* (2006.01)
*F16C 11/02* (2006.01)
*F16C 17/04* (2006.01)

(52) U.S. Cl.
CPC .......... *F16C 23/045* (2013.01); *F16C 11/045* (2013.01); *F16C 11/02* (2013.01); *F16C 17/04* (2013.01); *F16C 2326/43* (2013.01); *Y10T 403/32606* (2015.01)

(58) Field of Classification Search
CPC .......... F16C 11/04; F16C 11/045; Y10T 403/32221; Y10T 403/32606; Y10T 403/32861; Y10T 403/32868; Y10T 403/32877; Y10T 403/32926
USPC .......... 403/79, 119, 152, 157, 158, 365; 81/177.1, 177.2, 177.85
See application file for complete search history.

(56) References Cited

U.S. PATENT DOCUMENTS

| | | | |
|---|---|---|---|
| 3,441,299 A * | 4/1969 | Pfaar | 403/131 |
| 3,944,059 A * | 3/1976 | Garvey | 198/850 |
| 4,494,883 A | 1/1985 | Winter | |
| 4,808,023 A * | 2/1989 | Arnold et al. | 403/157 |
| 4,925,364 A | 5/1990 | Das | |
| 5,002,422 A * | 3/1991 | Schremmer et al. | 403/359.5 |
| 5,024,283 A * | 6/1991 | Deli | 180/89.14 |
| 5,961,219 A * | 10/1999 | Maughan | 384/220 |
| 6,131,291 A | 10/2000 | Mock | |
| 6,371,681 B1 | 4/2002 | Covington et al. | |
| 6,767,020 B2 * | 7/2004 | Yamamoto et al. | 280/124.109 |
| 6,939,076 B2 * | 9/2005 | LaPointe | 403/365 |
| 7,010,831 B1 * | 3/2006 | Beck et al. | 16/228 |
| 7,207,770 B2 | 4/2007 | Bruce | |
| 7,516,534 B2 | 4/2009 | Easterbrook et al. | |

(Continued)

FOREIGN PATENT DOCUMENTS

EP 1524413 A2 4/2005

*Primary Examiner* — Jonathan Masinick
(74) *Attorney, Agent, or Firm* — Cantor Colburn LLP

(57) ABSTRACT

A rod and bracket assembly includes a bracket with a rod connected to the bracket via a fastener extending through a bracket hole. A bushing assembly is positioned at the bracket hole and includes a bushing having a bushing flange and a wear pad positioned between the bushing flange and an inner face of the bracket to prevent wear of the bracket and/or the rod in the event that the rod rolls about its own axis. A clevis assembly for a clevis and rod assembly includes a clevis having one or more clevis legs extending from a clevis base and a bushing assembly located at a clevis hole. The bushing assembly includes a bushing having a bushing flange and a wear pad disposed between the bushing flange and an inner face of the clevis leg to prevent wear of the clevis leg and/or the rod assembly.

17 Claims, 3 Drawing Sheets

(56) References Cited

U.S. PATENT DOCUMENTS

| | | |
|---|---|---|
| 7,753,612 B2 | 7/2010 | Bouru et al. |
| 8,197,153 B2 | 6/2012 | Halcom et al. |
| 8,267,630 B2 | 9/2012 | Moon et al. |
| 2007/0110541 A1 | 5/2007 | Rawlins et al. |
| 2012/0171017 A1 | 7/2012 | Norem et al. |

* cited by examiner

ROD END WEAR PREVENTION

BACKGROUND

The subject matter disclosed herein relates to rod and clevis joints and, more specifically, to anti-chafing solutions for rod and clevis joints.

Rod and clevis joints are used in a variety of applications including, for example, actuation systems, rotors, landing gear, flight controls, and airframes of aircraft and other technologies. The typical rod and clevis joint includes a clevis, and a rod that fits between two arms of the clevis. A pin extends through holes in the clevis arms and through an eye in the rod to secure the rod to the clevis. In some rods, a rod end includes a monoball bearing in the eye to support the rod in the clevis and to allow for misalignment and relative motion between the rod and clevis. The bearing however, may also allow rolling of the rod about the rod axis, possibly resulting in contact between the rod end and the clevis. This contact manifests itself in rubbing/chafing between the two components resulting in wear of one of the components, depending on material hardness, and limiting of the service life thereof.

BRIEF DESCRIPTION

In one embodiment, a rod and bracket assembly includes a bracket with a rod connected to the bracket via a fastener extending through a bracket hole. A bushing assembly is positioned at the bracket hole and includes a bushing having a bushing flange and a wear pad positioned between the bushing flange and an inner face of the bracket to prevent wear of the bracket and/or the rod in the event that the rod rolls about its own axis.

In another embodiment, a clevis assembly for a clevis and rod assembly includes a clevis having one or more clevis legs extending from a clevis base and a bushing assembly located at a clevis hole. The bushing assembly includes a bushing having a bushing flange and a wear pad disposed between the bushing flange and an inner face of the clevis leg to prevent wear of the clevis leg and/or the rod assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
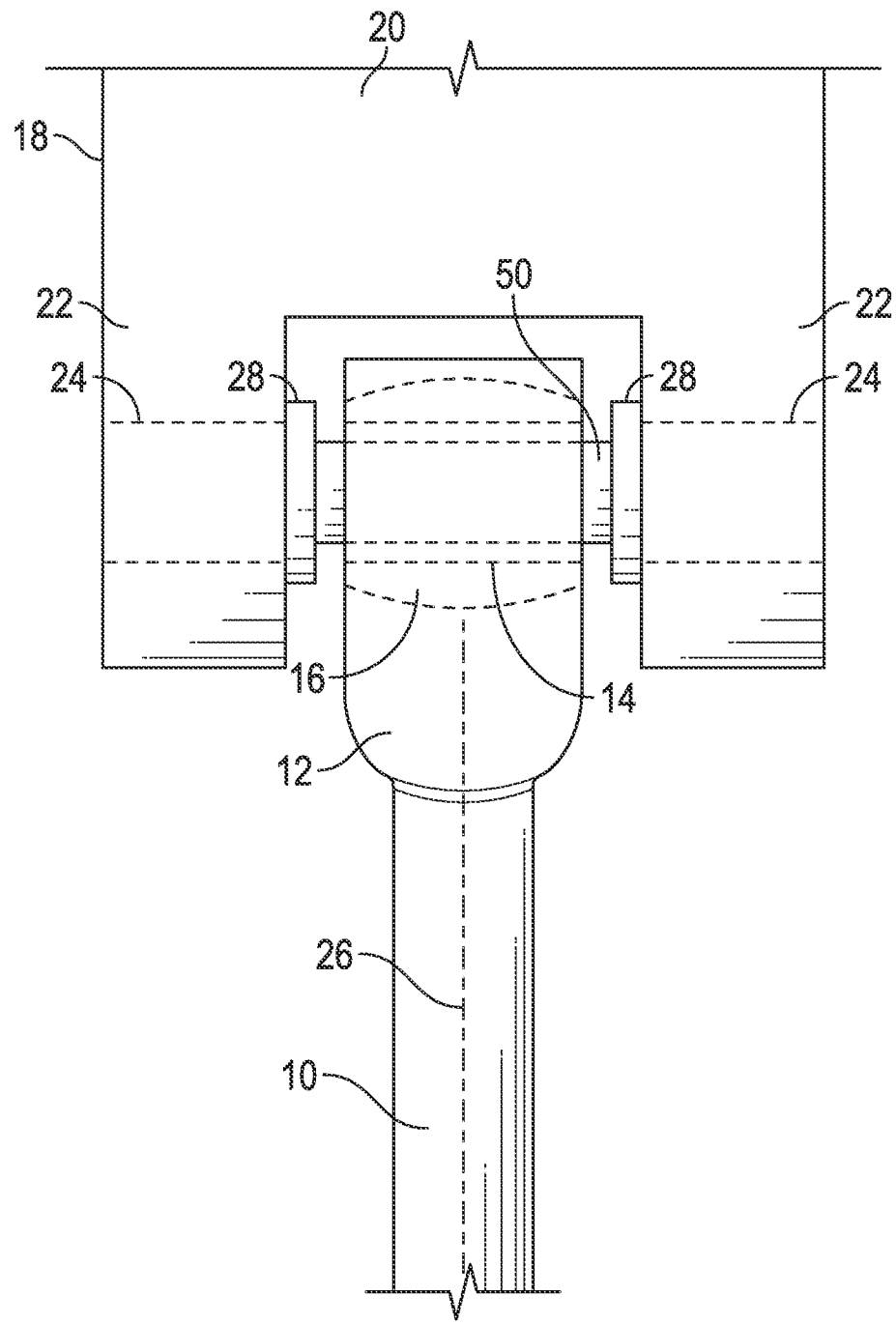
FIG. 1 is a planform view of an embodiment of a rod and clevis joint.

Shown in FIG. 1 is an embodiment of a rod and clevis joint arrangement. The joint may be of the type used in a variety of applications including, for example, actuation systems, rotors, landing gear, flight controls, and airframes of aircraft and other technologies. The arrangement includes a rod 10 having a rod end 12 including an eyelet 14. The eyelet 14 may include a bearing 16 disposed thereat, for example, a monoball bearing. The arrangement also includes a bracket, for example, a clevis 18, having a clevis base 20 and one or more clevis legs 22 extending from the clevis base 20. Each clevis leg 22 has a clevis hole 24 extending therethrough. The joint is arranged such that the rod end 12 is positioned adjacent to one or between two of the clevis legs 22, and a pin 50 or other fastener is extended from a first clevis hole 24a through the eyelet 14 and, in some cases, into a second clevis hole 24b. The presence of the bearing 16 allows for rotation of the rod 10 about a rod axis 26 such that under certain operating conditions, the rod end 12 may contact the clevis 18, resulting in wear of the rod end 12 and/or the clevis 18.

Figure 2:
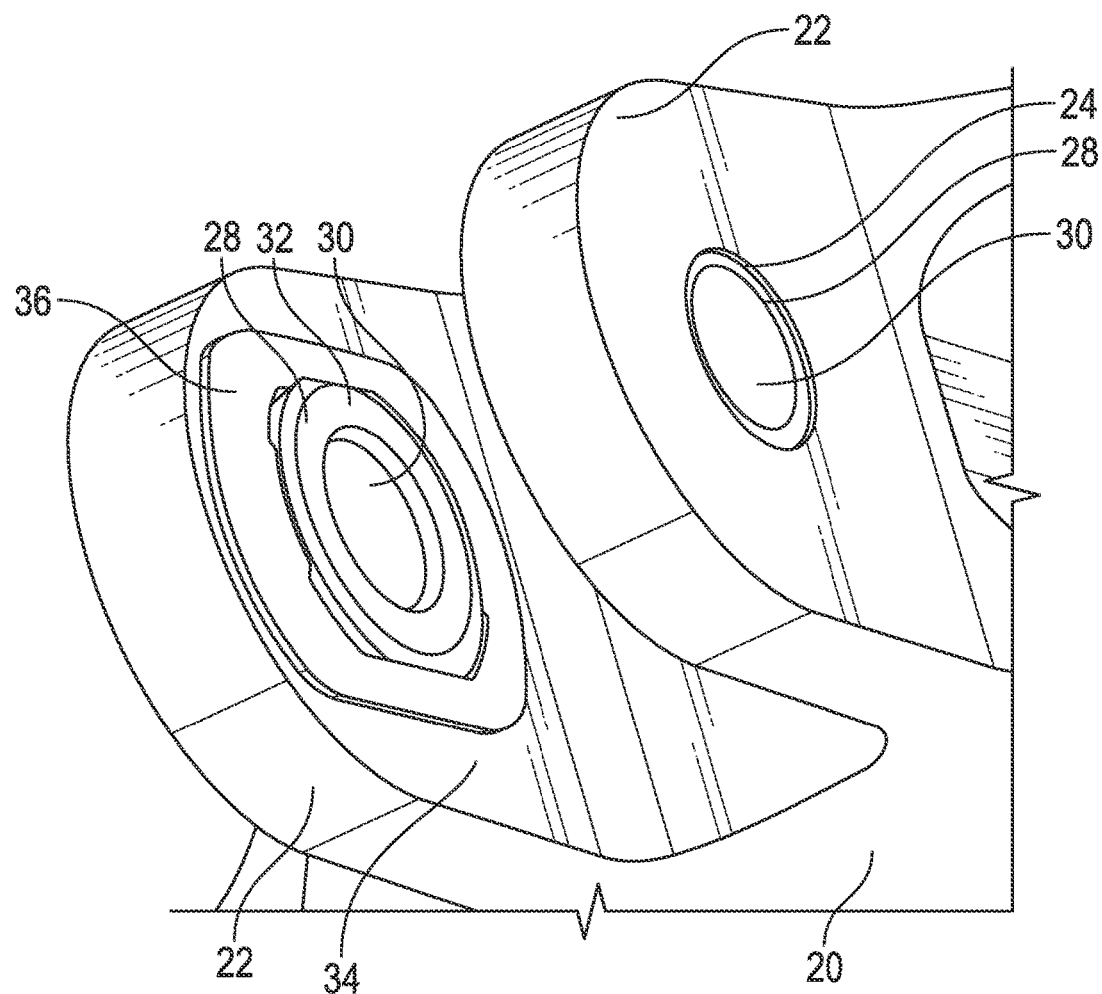
FIG. 2 is an isometric view of an embodiment of a clevis for a rod and clevis joint.

Referring to FIG. 2, a bushing 28 may be installed in the clevis hole 24. The bushing 28 has a body 30 disposed in the clevis hole 24 and a flange 32 located at an inner face 34 of the clevis 18. The bushing 28 is configured to retain a wear pad 36 located at the inner face 34. The wear pad 36 is formed from a plastic or other similar, relatively soft, deformable, sacrificial or nonabrasive material and is positioned between the rod end 12 and the clevis leg 22 to prevent abrasion or wear of the components.

Figure 3:
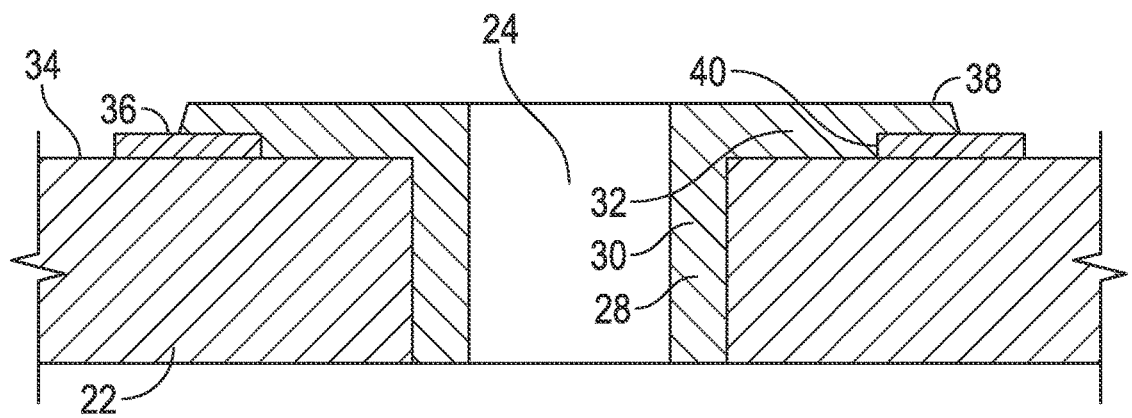
FIG. 3 is a cross-sectional view of an embodiment of a bushing and wear pad configuration for a rod and clevis joint.
Figure 4:
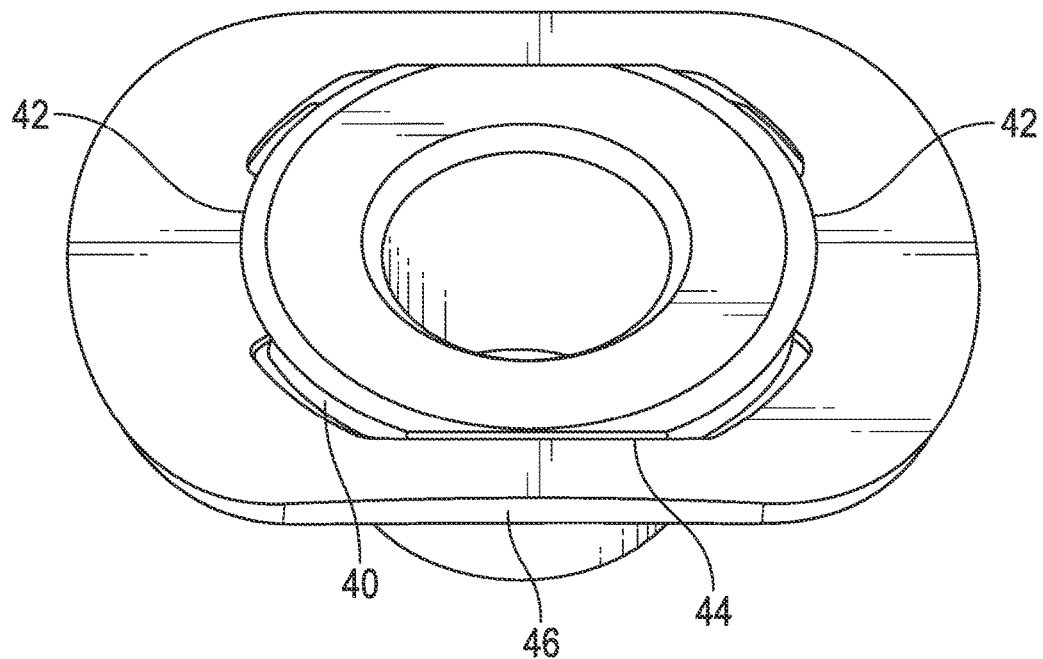
FIG. 4 is an isometric view of an embodiment of a bushing and wear pad configuration for a rod and clevis joint The detailed description explains embodiments of the invention, together with advantages and features, by way of example with reference to the drawings.

Referring to FIG. 3, in some embodiments, the bushing 28 includes a retaining lip 38 in the flange 32. The retaining lip 38 may be thinner than the flange 32 and, when the bushing 28 is installed in the clevis hole 24, results in a retention pocket 40 between the retaining lip 38 and the inner face 34. In this embodiment, referring to FIG. 4, the wear pad 36 includes deformable retaining tabs 42 that snap into the retention pocket 40 to secure the wear pad 36 to the clevis 18. Other means, however, may be used to secure the wear pad 36 to the clevis 18. For example, the wear pad 36 may have split features that snap together at installation to secure the wear pad 36 to the clevis 18 and/or the bushing 28. Further in some embodiments, the wear pad 36 is formed of multiple pieces for installation to the clevis 18, or alternatively is foldable for installation. Alternatively, the wear pad 36 may be installed to the bushing 28 prior to installation of the bushing 28 into the clevis hole 24. Either or both of the bushing 28 and the clevis 18 are utilized to secure the wear pad 36 in place. It is desired, however, that the wear pad 36 be removable and replaceable at intervals when the wear pad 36 becomes worn or damaged beyond acceptable limits. This replacement may be performed without removing the bushing 28 from the clevis hole 24 by removing the damaged wear pad 36 and installing another wear pad 36 into the retention pocket. Generally, the wear pad 36 has a perimeter that surrounds the flange 32. In some embodiments, the wear pad 36 is rectangular or oval, but in other embodiments, the wear pad 36 may be other shapes, for example circular. To align the rectangular or oval wear pad 36 in a selected orientation with respect to the flange 32, the flange 32 may include one or more flat portions 44 that are aligned with one or more wear pad flats 46. Further, the flat portions 44 prevent rotation of the wear pad 36 when the wear pad 36 comes in contact with the rod end 12, as well as provide clearance to the rod end 12, thereby facilitating greater misalignment capability. Other features, such as splines or keyways may also be used to align and/or derotate the wear pad 36.

As the sacrificial member in the assembly, the wear pad 36 preferably prevents wear to the clevis 18 and the rod end 12 during operation of the joint. The wear pad 36 is easily installed and replaced without affecting the surrounding parts including the bushing 28 and the clevis 18. Replacement of the wear pad 36 is highly cost effective relative to replacement of the clevis 18 and/or rod 10, and adds negligible weight to the joint.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Further, aspects of the invention may be applied to various industries, such as aerospace, automotive, construction, medical devices, and the like. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rod and bracket assembly comprising:
   a bracket;
   a rod connected to the bracket via a fastener extending through a bracket hole; and
   a bushing assembly disposed at the bracket hole including:
      a bushing having a bushing flange; and
      a wear pad disposed between the bushing flange and an inner face of the bracket, and retained thereat by the bushing flange, to prevent wear of the bracket and/or the rod.

2. The rod and bracket assembly of claim 1, wherein the bushing flange includes a retaining lip under which the wear pad is inserted.

3. The rod and bracket assembly of claim 2, wherein the retaining lip defines a retention pocket between the retaining lip and the inner face.

4. The rod and bracket assembly of claim 3, wherein the wear pad further comprises one or more retaining tabs insertable into the retention pocket.

5. The rod and bracket assembly of claim 1, further comprising one or more locating features on the wear pad to rotationally or translationally orient or secure the wear pad relative to the bushing.

6. The rod and bracket assembly of claim 1, wherein the wear pad is formed a material having increased softness, deformability, or non-abrasiveness compared to a softness, deformability or non-abrasiveness of the rod and the bracket.

7. The rod and bracket assembly of claim 1, wherein the wear pad is configured to be installed and/or removed after bushing installation into the bracket hole.

8. The rod and bracket assembly of claim 1, wherein the wear pad is formed of multiple wear pad components.

9. The rod and bracket assembly of claim 1, wherein the wear pad is bendable or foldable for installation.

10. The rod and bracket assembly of claim 1, wherein the bracket comprises a clevis having a clevis leg extending from a clevis base, the bracket hole disposed at the clevis leg.

11. A clevis assembly for a clevis and rod assembly comprising:
    a clevis having one or more clevis legs extending from a clevis base; and
    a bushing assembly disposed at a clevis hole including:
       a bushing having a bushing flange; and
       a wear pad disposed between the bushing flange and an inner face of the clevis leg, and retained thereat by the bushing flange, to prevent wear of the clevis leg.

12. The clevis assembly of claim 11, wherein the bushing flange includes a retaining lip under which the wear pad is inserted.

13. The clevis assembly of claim 12, wherein the retaining lip defines a retention pocket between the retaining lip and the inner face.

14. The clevis assembly of claim 13, wherein the wear pad further comprises one or more retaining tabs insertable into the retention pocket.

15. The clevis assembly of claim 11, further comprising one or more locating features on the wear pad to rotationally or translationally orient or secure the wear pad relative to the bushing.

16. The rod and bracket assembly of claim 11, wherein the wear pad is formed from a material having increased softness, deformability, or non-abrasiveness compared to a softness, deformability or non-abrasiveness of the rod and the clevis.

17. The clevis assembly of claim 11, wherein the wear pad is configured to be installed and/or removed after bushing installation into the clevis hole.

* * * * *